(No Model.)

H. S. ELLIOTT & W. SAUDERS.
FRUIT BASKET.

No. 541,476. Patented June 25, 1895.

Witnesses
Lewis E. Flanders
Lois Moulton

Inventors:
Harmon S. Elliott
William Sauders
By Attorney
Luther V. Moulton

UNITED STATES PATENT OFFICE.

HARMON S. ELLIOTT, OF SHELBY, AND WILLIAM SAUDERS, OF MONTAGUE, MICHIGAN.

FRUIT-BASKET.

SPECIFICATION forming part of Letters Patent No. 541,476, dated June 25, 1895.

Application filed April 11, 1895. Serial No. 545,420. (No model.)

*To all whom it may concern:*

Be it known that we, HARMON S. ELLIOTT, residing at Shelby, in the county of Oceana, and WILLIAM SAUDERS, residing at Montague, in the county of Muskegon, State of Michigan, citizens of the United States, have invented certain new and useful Improvements in Fruit-Baskets; and we do hereby declare the following to be a full, clear, and exact description of the invention, such as will enable others skilled in the art to which it appertains to make and use the same.

Our invention relates to improvements in fruit baskets, and its object is to provide the same with certain new and useful features, hereinafter more fully described and particularly pointed out in the claims, reference being had to the accompanying drawings, in which—

Figure 1:
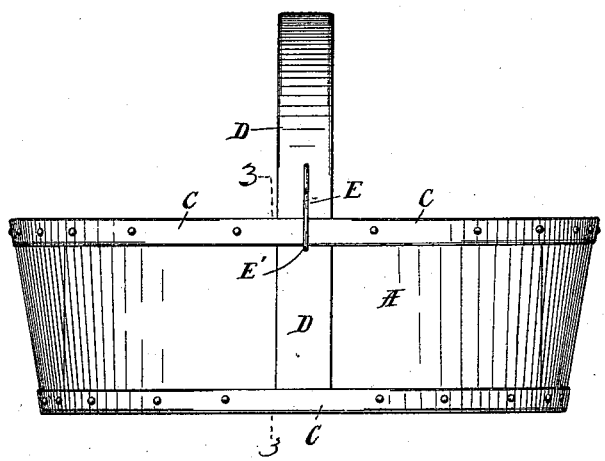
Figure 2:
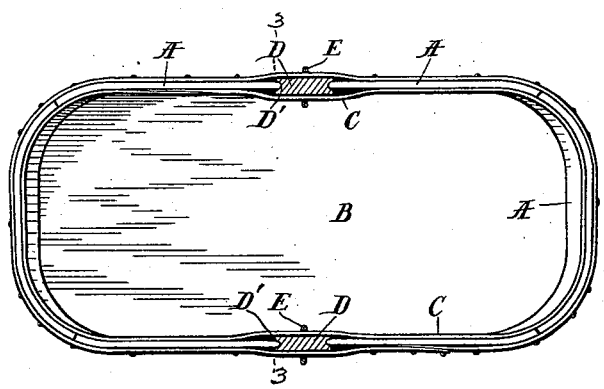
Figure 3:
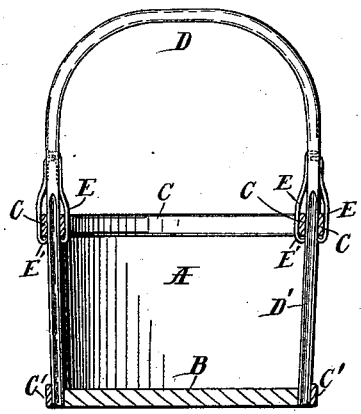

Figure 1 is a side elevation of a structure embodying our invention; Fig. 2, a plan view of the same, and Fig. 3 a section on the line 3 3 of Figs. 1 and 2.

Like letters refer to like parts in all of the figures.

A is the side of a fruit basket of the usual form, B the bottom, and C—C the strengthening strips, secured to the outer and inner sides of the same.

D is a handle engaged at the top of the basket by the strips C—C and at the bottom by the strip C and bottom B, and having in its edges grooves D', to receive the edge of the sides A of the basket. E, E are spring fastenings adapted to attach said handle to said basket and are formed of wire secured at one end to the handle and having the other end formed into a hook E', which when the handle is in place, engages the bottom of the strip C and prevents the handle from being pulled out.

Two fastenings may be used instead of four as shown.

To attach the handle to the basket, the ends of said handle are inserted between the strips C with the edge of the sides A engaging the grooves D' and forced to place. Said grooves form a guide for said handle and make a tight joint. When the hook shaped ends of the fastening E strike the strips C, said fastenings will spring outward and allow said hooks to pass said strips. They will then spring to place again and said hooks will engage the lower side of said strips, and prevent the handle from pulling out.

By this construction we are able to make a basket having a strong and serviceable handle, requiring no nails and which can be readily attached, or detached at pleasure.

What we claim is—

1. In a basket, in combination with the sides thereof, a handle having grooves in its edges adapted to receive the edges of said sides, substantially as described.

2. In combination with a basket, having openings in its sides, a detachable handle adapted to close said openings and form part of said sides, and means for detachably securing said handle in place, substantially as described.

3. In combination, a basket having strengthening strips near its top, a handle, spring fastenings secured at one end to said handle, and hooks at the other end of said fastenings, adapted to engage said strips, substantially as described.

4. In a basket, in combination with the sides thereof, strengthening strips secured to the inner and outer sides, a handle having grooves in its edges, spring fastenings secured to said handle, and hooks on said fastenings, substantially as described.

In testimony whereof we affix our signatures in presence of two witnesses.

HARMON S. ELLIOTT.
     WILLIAM SAUDERS.

Witnesses:
 MICHAEL TUCKER,
 WALTER E. MOORE.